US005370589A

United States Patent [19]
Lepelletier

[11] Patent Number: 5,370,589
[45] Date of Patent: Dec. 6, 1994

[54] FIVE-SPEED THREE PLANETARY GEARSETS AUTOMATIC TRANSMISSION FOR PASSENGER CARS

[76] Inventor: Pierre A. G. Lepelletier, 23 avenue Adrien Moisant, 78400 Chatou, France

[21] Appl. No.: 87,403

[22] Filed: Jul. 8, 1993

[30] Foreign Application Priority Data

Jul. 15, 1992 [FR] France ............................. 9208712

[51] Int. Cl.⁵ .................... F16H 3/64; F16H 57/10
[52] U.S. Cl. ............................ 475/286; 475/287; 475/290
[58] Field of Search ............ 475/275, 282, 286, 287, 475/290, 291

[56] References Cited

U.S. PATENT DOCUMENTS

| | | | |
|---|---|---|---|
| 3,915,033 | 10/1975 | Polak | 475/286 X |
| 4,811,631 | 3/1989 | Honig et al. | 475/282 |
| 4,934,216 | 6/1990 | Sandel et al. | 475/59 |
| 5,071,398 | 12/1991 | Hotta et al. | 475/276 |
| 5,106,352 | 4/1992 | Lepelletier | 475/280 |
| 5,129,871 | 7/1992 | Sandel et al. | 475/297 |
| 5,133,697 | 7/1992 | Hattori | 475/290 X |
| 5,226,862 | 7/1993 | Hattori | 475/286 |

FOREIGN PATENT DOCUMENTS 4110406 10/1991 Germany .
2107008 4/1983 United Kingdom .

OTHER PUBLICATIONS

Warrendale, "Overdrive automatic features multi-functional elements", Automotive Engineering, Jul. 1978, vol. 96, No. 7, pp. 56–59.

Jatco Corporation, "Four-Speed Fill Range Electronically Controlled Automatic Transmission with Turbine Revolution Sensor JR404E".

Japan Automatic Transmission Co., Ltd., "JF403E New 4-speed Electronically Controlled Automatic Transmission".

*Primary Examiner*—Dirk Wright
*Assistant Examiner*—Khoi Q. Ta
*Attorney, Agent, or Firm*—Young & Thompson

[57] ABSTRACT

An automatic transmission for passenger cars has input and output shafts in alignment, three planetary gearsets, first, second and third control clutches and first and second control brakes, and can be coupled to a torque converter with or without a lock-up clutch. Five forward gears and a reverse drive are provided, with excellent ratio progression and high design versatility. As a rule, a direct drive available between third and fourth gears is not used. A first one-way clutch can be added in parallel with the first control brake to facilitate first-/second and second/first power-on gearshifts. A second one-way clutch can be added in parallel with the second control clutch to facilitate fourth/fifth and fifth-/fourth power-on gearshifts, without requiring an additional control clutch to be mounted in series to release it in other gears. The transmission is remarkably compact and can easily be substituted for existing four-speed transmissions.

3 Claims, 3 Drawing Sheets

| | R | 1 | 2 | 3 | 4 | 5 |
|---|---|---|---|---|---|---|
| $C_1$ | | X | X | X | | |
| $C_2$ | X | | | X | (X) | |
| $C_3$ | | | | | X | X |
| $B_1$ | X | (X) | | | | |
| $B_2$ | | | X | | | X |

5,370,589

FIVE-SPEED THREE PLANETARY GEARSETS AUTOMATIC TRANSMISSION FOR PASSENGER CARS

BACKGROUND OF THE INVENTION

1. Field of the Invention

The present invention relates to automatic transmissions, in particular for passenger cars, comprising planetary gearsets controlled by hydraulically actuated friction elements such as clutches and brakes, and generally coupled to a start-up coupling device subject to slip, such as a hydraulic torque converter or a fluid coupling.

2. Description of the Prior Art

Most transmissions of this type now on the market offer four gears, and utilize a hydraulic torque converter, two simple planetary gearsets or a Ravigneaux gearset, five friction elements, and a one-way clutch to facilitate first/second and second/first power-on gearshifts. Very often, the torque converter includes a lock-up clutch to eliminate slippage outside transient conditions, so as to improve fuel economy.

Furthermore, a large number of such transmissions also utilize a second one-way clutch to facilitate second/third and third/second, or third/fourth and fourth/third power-on gearshifts and an additional friction element mounted in series with this one-way clutch to release it in other gears. Beside the planetary gearsets, the torque converter and possibly the lock-up clutch, these transmissions thus nowadays utilize a regular number of shift elements comprising five friction elements and one one-way clutch, or six friction elements and two one-way clutches, to provide four gears.

The object of the present invention is a higher performance transmission, which at once utilizes a more advantageous number of shift elements, i.e. five friction elements and one one-way clutch, or five friction elements and two one-way clutches, to provide five gears, sufficiently compact to be easily substituted for such known four-speed transmissions.

SUMMARY OF THE INVENTION

In accordance with the invention, there is provided an automatic transmission, particularly for passenger cars, comprising between an input shaft and an output shaft in alignment in a casing: first, second, and third planetary gearsets, each of the gearsets having a planet carrier carrying planet pinions meshing with a sun gear and with a ring gear, and five friction elements comprising three clutches and two brakes. The selective operation of pairs of friction elements determines various gear ratios between the input shaft and the output shaft. The sun gear of the third planetary gearset is fixed to the input shaft; the ring gear of the second planetary gearset and the planet carrier of the third planetary gearset are fixed to the output shaft; the sun gear of the first planetary gearset is fixed to the casing; and the planet carrier of the first planetary gearset and the sun gear of the second planetary gearset are fixed for rotation with each other. The planet carrier of the second planetary gearset is coupled respectively to the ring gear of the third planetary gearset and to the input shaft through the first and third control clutches and held against rotation by the first control brake. The ring gear of the first planetary gearset is coupled to the input shaft through the second control clutch and held against rotation by the second control brake.

Such a transmission thus provides five forward gears and one reverse drive by selective operation of pairs of the five friction elements: a first forward gear by the first control clutch and the first control brake, a second forward gear by the first control clutch and the second control brake, a third forward gear by the first and second control clutches, a fourth forward gear by the second and third control clutches, a fifth forward gear by the third control clutch and the second control brake, and a reverse drive by the second control clutch and the first control brake.

In order to facilitate first/second and second/first power-on gearshifts, the transmission could be further provided with a first one-way clutch directly mounted in parallel with the first control brake so as to prevent the planet carrier of the second planetary gearset from rotating in a direction opposite to that of the input shaft, whereby a first gear traction mode is established simply by engaging the first control clutch.

Likewise in order to facilitate fourth/fifth and fifth/fourth power-on gearshifts, the transmission could also be provided with a second one-way clutch directly mounted in parallel with the second control clutch so as to prevent the ring gear of the first planetary gearset from rotating faster than the input shaft, whereby a fourth gear traction mode is established simply by engaging the third control clutch.

The features and advantages of the invention will further emerge from the following description with reference to the accompanying drawings.

DESCRIPTION OF THE PREFERRED EMBODIMENTS

Figures 1, 2:
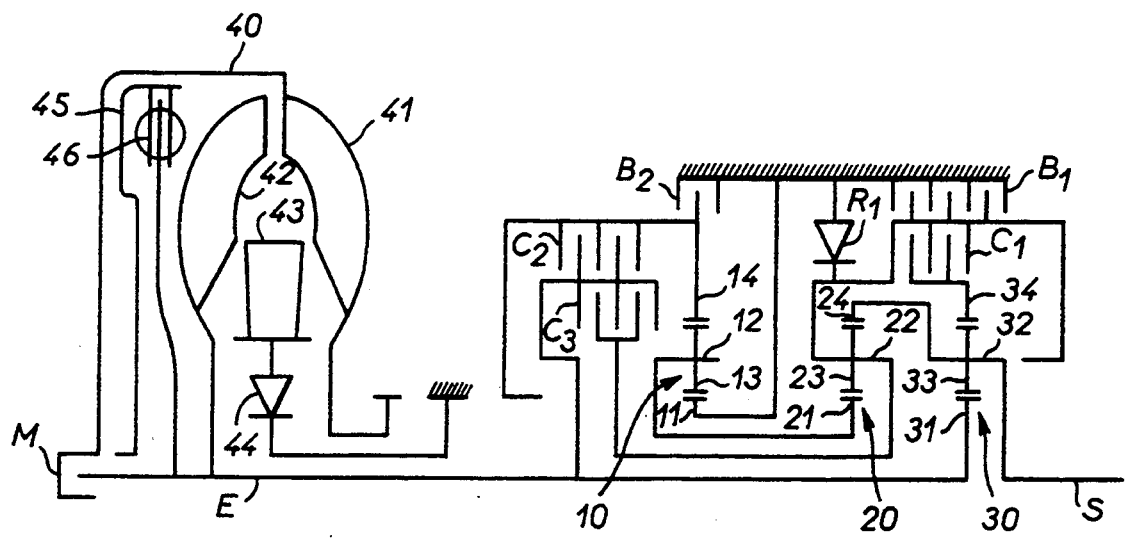
FIG. 1 is a schematic view of a transmission in accordance with the invention, with a first one-way clutch for first/second and second/first power-on gearshifts.
FIG. 2 shows the selective table of the friction elements.

With reference to the view of FIG. 1, a transmission in accordance with the invention includes an input shaft E and an output shaft S housed in alignment in a casing. A first planetary gearset 10 has a planet carrier 12 carrying planet pinions 13 meshing with a sun gear 11 and a ring gear 14. A second planetary gearset 20 has a planet carrier 22 carrying planet pinions 23 meshing with a sun gear 21 and a ring gear 24. A third planetary gearset 30 has a planet carrier 32 carrying planet pinions 33 meshing with a sun gear 31 and a ring gear 34. The sun gear 31 is fixed to the input shaft E, the ring gear 24 and the planet carrier 32 are fixed to the output shaft S, the sun gear 11 is fixed to the casing, and the planet carrier 12 and the sun gear 21 are fixed for rotation with each other.

A first control clutch $C_1$ is inserted between the planet carrier 22 and the ring gear 34, a second control clutch $C_2$ is inserted between the input shaft E and the ring gear 14, and a third control clutch $C_3$ is inserted between the input shaft E and the planet carrier 22. A first control brake $B_1$ is provided to hold the planet carrier 22 against rotation and a second control brake $B_2$ is provided to hold the ring gear 14 against rotation. A first one-way clutch $R_1$ could also be added in parallel with the first control brake $B_1$, so as to prevent the planet carrier 22 from rotating in a direction opposite to that of the input shaft E.

The transmission is made complete by a torque converter 40 having an impeller 41 coupled to the engine M, a turbine 42 coupled to the input shaft E, a stator 43, a one-way clutch 44, a lock-up clutch 45, and a torsional vibration damper 46.

Operation is as follows:

In first gear, the first control clutch $C_1$ and the first control brake $B_1$ are engaged. The planet carrier 22 and the ring gear 34 are held against rotation. Motion is transmitted according to the low reduction ratio of gearset 30, with a locked ring gear. The sun gear 21 and the planet carrier 12 are driven in the opposite direction by the gearset 20.

In second gear, the first control clutch $C_1$ and the second control brake $B_2$ are engaged. The planet carrier 12 and the sun gear 21 are held against rotation. The planet carrier 22 and the ring gear 34 are driven at a reduced speed. Motion is transmitted according to a first intermediate reduction ratio of gearset 30.

In third gear, the first and second control clutches $C_1$ and $C_2$ are engaged. The planet carrier 12 and the sun gear 21 are driven in direct direction according to the reduction ratio G of gearset 10, with a locked sun gear. The planet carrier 22 and the ring gear 34 are driven at a higher speed. Motion is transmitted according to a second intermediate reduction ratio of gearset 30.

In fourth gear, the second and third control clutches $C_2$ and $C_3$ are engaged. The planet carrier 12 and the sun gear 21 are still driven according to the reduction ratio G. Motion is transmitted according to an intermediate overdrive ratio of gearset 20.

In fifth gear, the third control clutch $C_3$ and the second control brake $B_2$ are engaged. The planet carrier 12 and the sun gear 21 are held against rotation. Motion is transmitted according to the full overdrive ratio of gearset 20, with a locked sun gear.

In reverse drive, the second control clutch $C_2$ and the first control brake $B_1$ are engaged. The planet carrier 12 and the sun gear 21 are driven according to the reduction ratio G. The planet carrier 22 is held against rotation. Motion is transmitted according to G and the reverse drive ratio of gearset 20, with a locked planet carrier.

The one-way clutch $R_1$ prevents the planet carrier 22 from rotating in a direction opposite to that of the input shaft E and produces in first gear the same effect as an engagement of the first control brake $B_1$, less engine braking. Also, it freewheels in other gears. A traction mode in first gear is then established simply by engaging the first control clutch $C_1$, while power-on first/second up-shifts and second/first down-shifts are performed simply by engaging and disengaging the second control brake $B_2$, and thus are made easier to control.

FIG. 2 shows the selective table of the friction elements. It will be appreciated that the change from each gear to the next is achieved throughout the whole range simply by changing one of the two friction elements engaged, i.e. exclusively by single-transition shifts, offering the greatest actuating possibilities.

Figure 4:
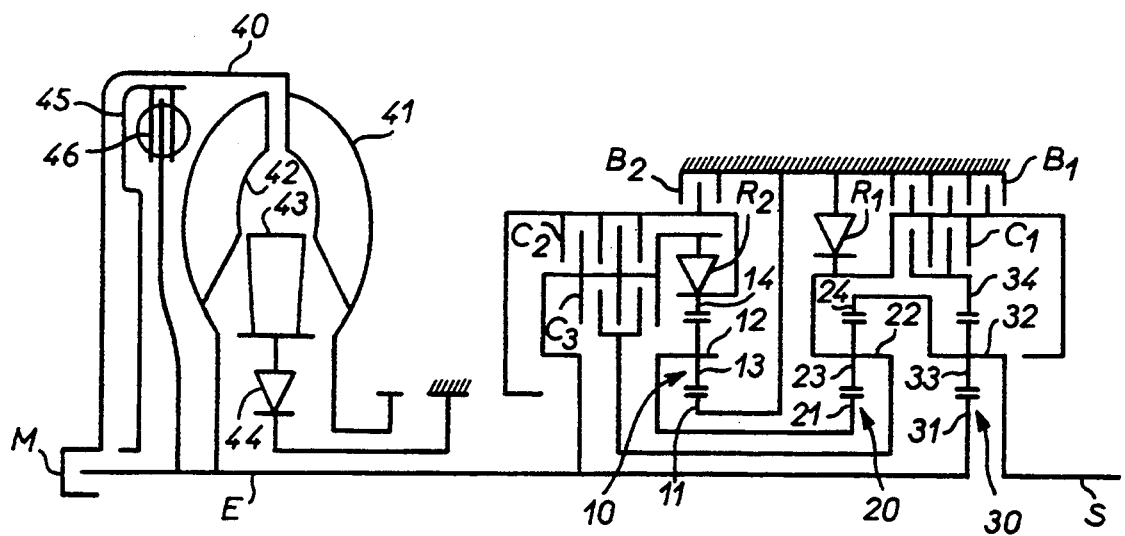
FIG. 4 is a variation of the transmission of FIG. 1, with a second one-way clutch for fourth/fifth and fifth/fourth power-on gearshifts.

In this table, actuations which are optional, due to the provision of one-way clutches $R_1$ and $R_2$ respectively for first and fourth gears, i.e. actuation of $B_1$ for first gear and actuation of $C_2$ for fourth gear, as further explained in FIG. 4, are shown in parentheses.

Figure 3:
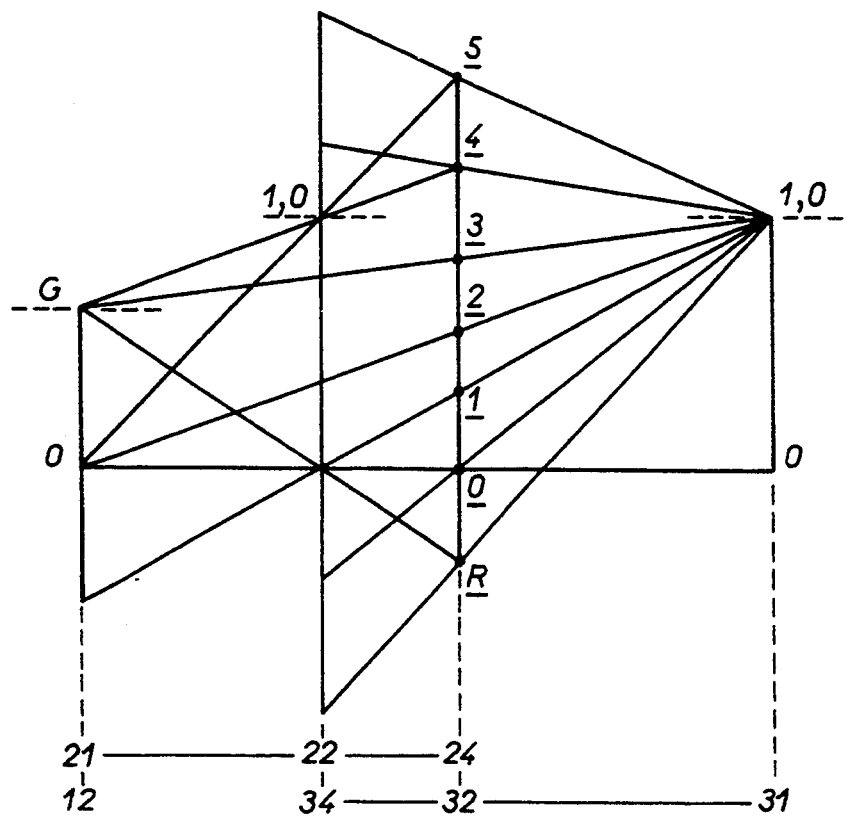
FIG. 3 a diagram showing the rotational speeds in the second and third planetary gearsets.

FIG. 3 is a diagram showing the rotational speeds in the gearsets 20 and 30 related to the speed of the input shaft E taken as unity. It will be appreciated that all derivative speeds remain within very reasonable limits.

At last, it will be noted that two extra conditions are available, i.e. a braked neutral, in which the input shaft E is free to rotate and the output shaft S is held against rotation—established by engaging the first and second control brakes $B_1$ and $B_2$—and a direct drive—intermediate between third and fourth gears—established by engaging the first and third control clutches $C_1$ and $C_3$.

Table 1 offers three examples of possible ratio series as functions of the number of teeth of the three planetary gearsets 10, 20 and 30. Gear ratios are given as speed of the output shaft S related to speed of the input shaft E taken as unity, independently of the slip of the torque converter 40. Step ratios represent actual ratios between two consecutive gears. Spread ratios represent actual ratios between extreme gears, i.e. fifth to first speed ratio for the forward spread ratio, and fifth to reverse speed ratio for the reverse spread ratio. Direct drive, intermediate between third and fourth gears, is not used.

TABLE 1

|  | Example 1 | Example 2 | Example 3 |
|---|---|---|---|
|  | Number of teeth | | |
| Sun gear 11 | 43 teeth | 40 teeth | 37 teeth |
| Ring gear 14 | 71 teeth | 71 teeth | 71 teeth |
| Planet pinions 13 | 14 teeth | 15 teeth | 17 teeth |
| Sun gear 21 | 37 teeth | 40 teeth | 43 teeth |
| Ring gear 24 | 71 teeth | 71 teeth | 71 teeth |
| Planet pinions 23 | 17 teeth | 15 teeth | 14 teeth |
| Sun gear 31 | 31 teeth | 31 teeth | 31 teeth |
| Ring gear 34 | 71 teeth | 71 teeth | 71 teeth |
| Planet pinions 33 | 20 teeth | 20 teeth | 20 teeth |
|  | Gear– Step– Spread ratios | | |
| Reverse Drive | 0,325 | 0,360 | 0,398 |
|  | } 1,068 | } 1,186 | } 1,310 |
| 1st | 0,304 | 0,304 | 0,304 |
|  | } 1,844 | } 1,803 | } 1,765 |
| 2nd | 0,560 | 0,548 | 0,537 |
|  | } 1,489 | } 1,528 | } 1,568 |
| 3rd | 0,834 | 0,837 | 0,841 |
|  | } 1,434 | } 1,437 | } 1,435 |

TABLE 1-continued

|  |  | Example 1 |  | Example 2 |  | Example 3 |  |
|---|---|---|---|---|---|---|---|
| 4th |  | 1,197 | } 1,271 | 1,203 | } 1,300 | 1,207 | } 1,330 |
| 5th |  | 1,521 |  | 1,563 |  | 1,606 |  |
| Spread ratio | Forward | 5,005 | 1,068 | 5,144 | 1,186 | 5,283 | 1,310 |
| | Reverse | 4,687 |  | 4,338 |  | 4,033 |  |

These ratio series are perfectly suited to five-speed transmissions and demonstrate a remarkable versatility. It will be easily understood that gear modifications, or even mere permutations of planetary gearsets would further enhance this versatility.

Reference should now be made to FIG. 4, which shows a modified embodiment of the transmission of FIG. 1, with a second one-way clutch $R_2$ mounted in parallel with the second control clutch $C_2$ so as to prevent the ring gear 14 from rotating faster than the input shaft E. In the fourth gear traction mode, the sun gear 21 and the planet carrier 12 are no longer driven, but now drive the input shaft E, and disengagement of the second control clutch $C_2$ suffices to establish unidirectional drive through the one-way clutch $R_2$, and to inactivate engine braking. Power-on fourth/fifth upshifts and power-on fifth/fourth down-shifts are then performed simply by engaging and disengaging the second control brake $B_2$, and thus are made easier to control. With reference to the rotational speed diagram of FIG. 3, it will be appreciated that the sun gear 21 and the planet carrier 12 never exceed the reduction ratio G, hence the rotational speed of the ring gear 14 never exceeds that of the input shaft E. This obviates the need for providing an additional control clutch in series with the one-way clutch $R_2$ to release it in other gears, and thus maintains, advantageously, a number of shift elements of five friction elements only and two one-way clutches, to provide five gears.

Figure 5:
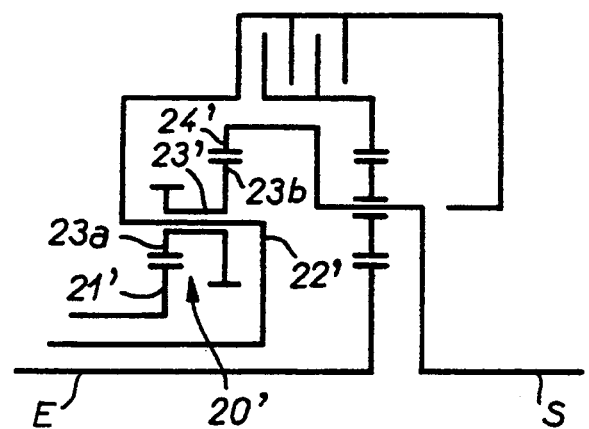
FIG. 5 shows a modified embodiment of FIG. 1, with a planetary gearset having stepped planet pinions.

According to a further modified embodiment shown in FIG. 5, one of the planetary gearsets, and for instance the second gearset 20 of FIG. 1, is replaced by a gearset 20' having stepped planet pinions. The gearset 20' has a planet carrier 22' carrying planet pinions 23' provided with two sets of teeth, a set 23a meshing with a sun gear 21' and a set 23b meshing with a ring gear 24'.

Operation is the same as in FIG. 1. In the case of Example 3, the following teeth numbers:

| Sun gear 21' | : 39 teeth |
|---|---|
| Ring gear 24' | : 87 teeth |
| Planet pinions 23' | { 23a: 20 teeth |
|  | { 23b: 27 teeth | would practically produce the same gear ratios, step ratios and spread ratios.

The invention is not limited to the embodiments described and shown for illustrative purposes only, but encompasses all variations. In particular, other arrangements concerning the planetary gearsets 10, 20, 30, the reduction ratio G, and/or the possible use of a direct drive by simultaneous engagement of the first and third control clutches $C_1$ and $C_3$, will fall within the true spirit and scope of the invention as defined in the appended claims.

What I claim is:

1. An automatic transmission, in particular for passenger cars, comprising between an input shaft and an output shaft in alignment in a casing, first, second, and third planetary gearsets, each of the gearsets having a respective planet carrier carrying planet pinions meshing with a respective sun gear and with a respective ring gear, and five friction elements comprising three clutches and two brakes, selective operation of pairs of friction elements determining various gear ratios between the input shaft and the output shaft, said sun gear of said third planetary gearset being fixed to the input shaft, said ring gear of said second planetary gearset and said planet carrier of said third planetary gearset being fixed to the output shaft, said sun gear of the first planetary gearset being fixed to the casing, said planet carrier of said first planetary gearset and said sun gear of said second planetary gearset being fixed for rotation with each other, said planet carrier of said second planetary gearset being coupled respectively to said ring gear of said third planetary gearset and to the input shaft through said first and third control clutches and held against rotation by said first control brake, and said ring gear of said first planetary gearset being coupled to the input shaft through said second control clutch and held against rotation by said second control brake, said transmission providing five forward gears and one reverse drive by selective operation of pairs of said five friction elements: a first forward gear by said first control clutch and said first control brake, a second forward gear by said first control clutch and said second control brake, a third forward gear by said first and second control clutches, a fourth forward gear by said second and third control clutches, a fifth forward gear by said third control clutch and said second control brake, and a reverse drive by said second control clutch and said first control brake.

2. An automatic transmission according to claim 1, further comprising a first one-way clutch directly mounted in parallel with said first control brake so as to prevent said planet carrier of said second planetary gearset from rotating in a direction opposite to that of the input shaft, whereby a first gear traction mode is established simply by engaging the first control clutch.

3. An automatic transmission according to claim 1, further comprising a second one-way clutch directly mounted in parallel with said second control clutch so as to prevent said ring gear of said first planetary gearset from rotating faster than the input shaft, whereby a fourth gear traction mode is established simply by engaging the third control clutch.

* * * * *